July 21, 1970 MASATO KAMIMURA ET AL 3,521,508
COVERED CORD STRIPPING MACHINE
Filed Nov. 28, 1967 3 Sheets-Sheet 1
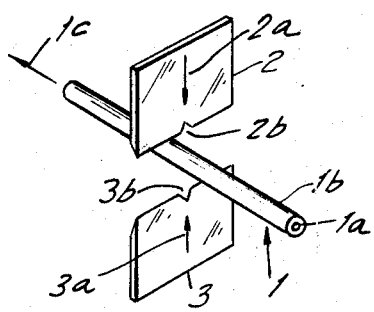
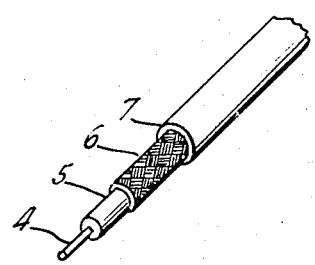
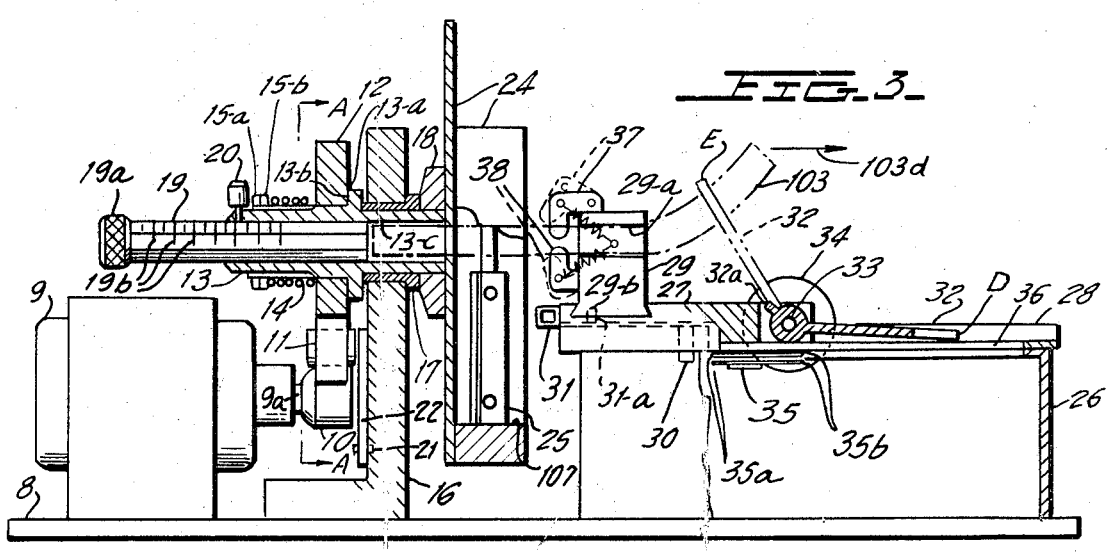
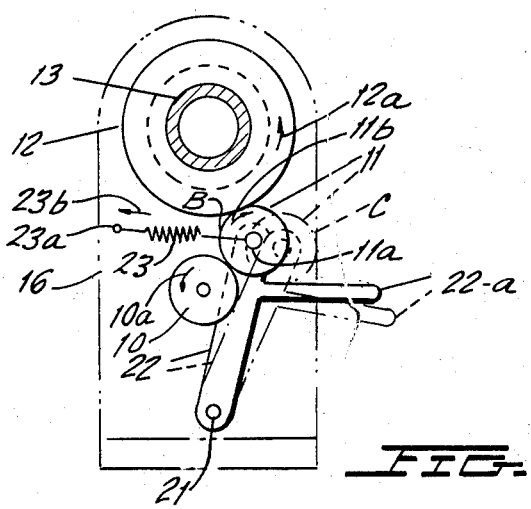
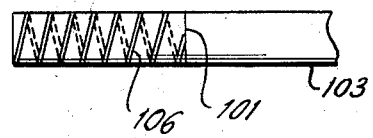
INVENTORS
MASATO KAMIMURA
SABURO FUKUI
BY
OSTROLENK, FABER, GERB & SOFFEN
ATTORNEYS

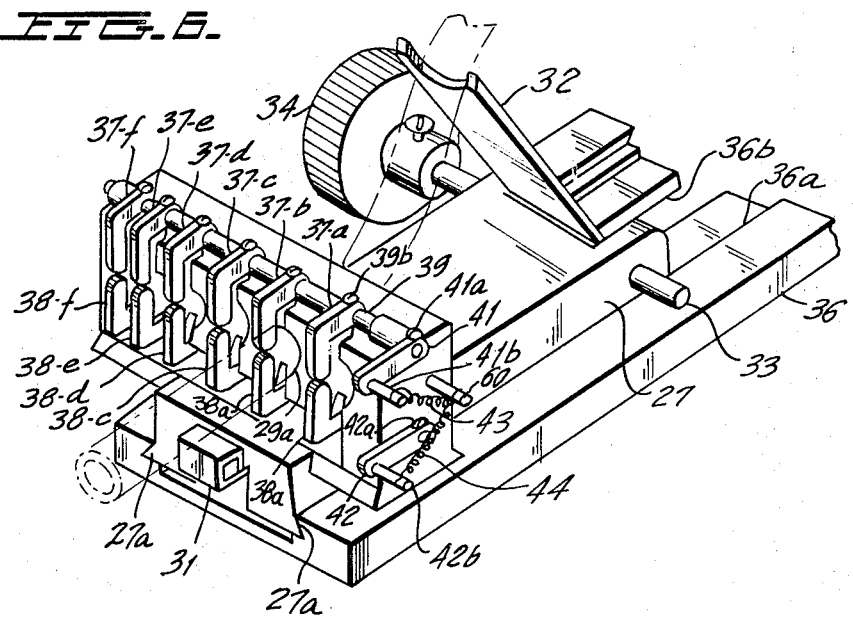
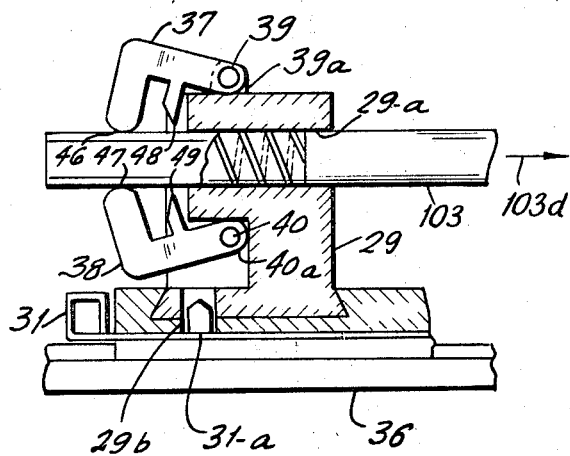
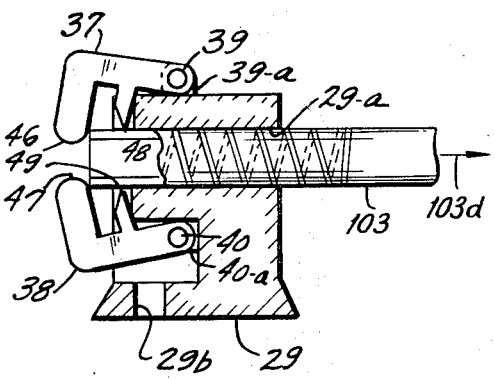
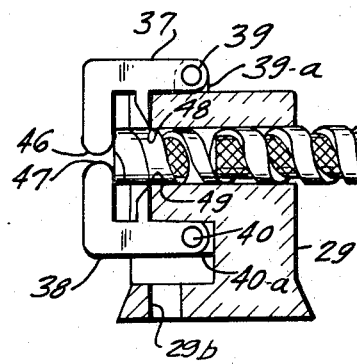

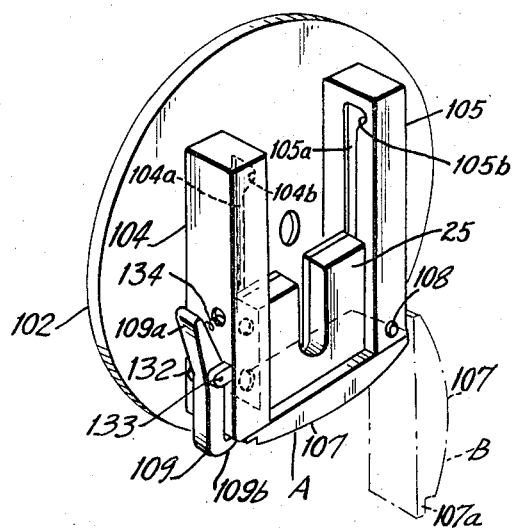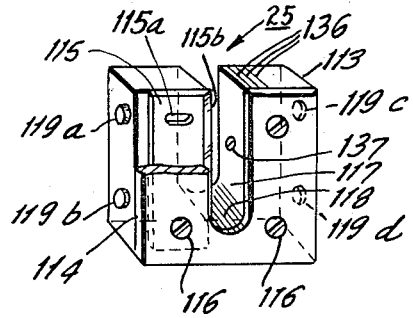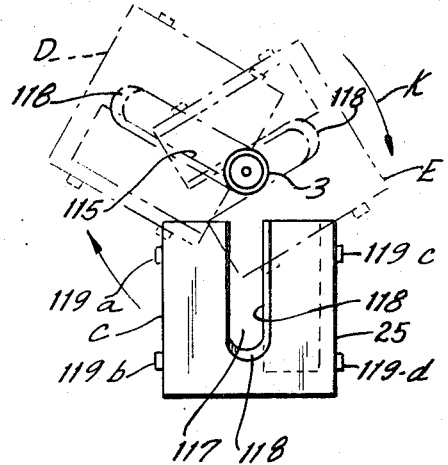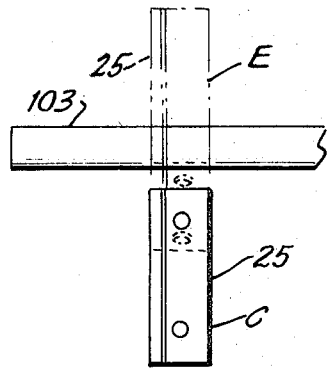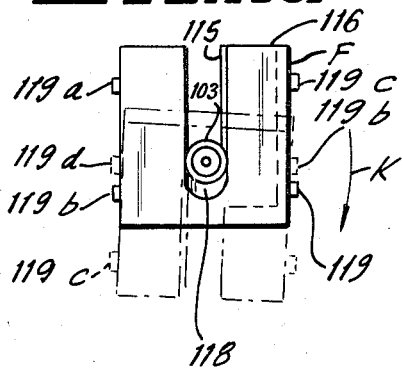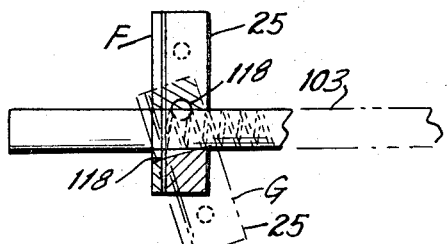

United States Patent Office 3,521,508
Patented July 21, 1970

3,521,508
COVERED CORD STRIPPING MACHINE
Masato Kamimura and Saburo Fukui, Tokyo, Japan, assignors to Nippon Electric Company Limited, Tokyo, Japan
Filed Nov. 28, 1967, Ser. No. 686,147
Claims priority, application Japan, Nov. 29, 1966, 41/78,542
Int. Cl. H02g 1/12
U.S. Cl. 81—9.51                                14 Claims

ABSTRACT OF THE DISCLOSURE

A substantially fully automatic device for stripping insulating sleeves from covered conductors, coaxial cables, sheathed cords and the like, including means for forming a substantially annular slit at a spaced distance in from one end of the cable being stripped and means for then forming a substantially spiral or helical shaped slit extending from the annular slit toward one end of the cable being stripped and means for removing the stripped portion of the insulating sleeve as the cable being stripped is removed from the stripping device.

---

The present invention relates to electrical cables and the like, and more particularly to a substantially fully automatic device for stripping a portion of the outer insulating sheath or covering from such cables without the need for exerting any significant pulling force for removal of the stripped portion from the cable as was heretofore required in conventional techniques and providing means for forming a helical slit in the portion of the cable covering to be removed and for automatically removing the portion to be stripped away as the cable being stripped is removed from the automatic apparatus.

Covered wires, cables (such as coaxial cables) and conductors of all forms having an outer insulating cover are in quite widespread use in electrical, electronic, communication and power distribution fields. Application of such wires, conductors and the like, is made possible by stripping or baring a portion of the conductor to permit and facilitate connection of the cable, usually at its opposite ends, to the electrical, electronic or power distribution equipment. The stripping operation is usually performed by stripping machines which characteristically have ben found to be effective for performing the cover stripping operation upon such cords, cables, conductors and the like.

The preparation of such wires, conductors or cables for connection to electrical terminals typically comprises providing a stripping means having either one or two blades which are aligned transverse to the cable longitudinal axis for cutting a substantially annular slit at a predetermined location along the length of the cable. With the blades retained in the slit which they have formed, a pulling force is exerted upon the cable in a predetermined axial direction causing the cover to be stripped off while the blades are retained into their driven position.

This method has been found to be quite effective when employed with conventional covered wires which are relatively fine (i.e. of relatively small outer diameter). However, the application of such stripping devices for communication cables, coaxial cables, and similarly covered cords of relatively large cross-section have shown such devices to be unsatisfactory in use since an extremely large pulling force is normally required to form the slit in the cord cover and to draw or pull the cord from the section being stripped therefrom so as to expose the laminated section underlying the cover to damage.

The most common method of manufacturing communication cables and coaxial cords is the extrusion method. In one typical manufacturing process the cables are sheathed in polyvinyl chloride which cables include an insulating tape of woven fabric, a soft copper wire shield braid or other like material covering the cable in direct contact therewith and a polyvinyl chloride material employed as the outer covering or sheath for the cable. The outer sheath has been found to impregnate the inner layer or to penetrate into the interstices of the woven or knit structure making it exceedingly difficult to strip the cable using conventional techniques.

A further problem with the conventional stripping method has been that the cable sheaths of the type described above cannot be stripped without impairing the insulator tape or shield braid underlying the outer covering and thus with most of such covered cords it has been practically impossible to apply an automatic method thereby necessitating performance of a manual stripping operation through the use of a knife or other like hand implement. As a result of these almost insurmountable problems there has long been a demand for a special stripping device capable of stripping coaxial cords, communication cables and other like cords of relatively thick diameter without causing any damage to the internal structure lying immediately adjacent the outer covering.

The present invention is comprised of a rotatable means culties through the employment of a cable stripping operation to remove a portion of the outer cover by forming a slit of proper depth in that portion of the cable covering which is to be stripped wherein the slit follows a substantially helical pattern running substantially the entire length of the section to be stripped away thereby completely avoiding the necessity for any excessively large pulling force in the final removal operation.

The present invention is comprised of a rotatable means which includes a slidable slitter cartridge. The rotatable means receives the cable or covered cord to be stripped through a central opening. In the loading position the slitter cartridge which is provided with a slot for ultimately receiving the cable is positioned with the open end of the slot lying below the cable. Once the cable is inserted to the appropriate depth the rotatable means is driven into rotational movement causing the slitter cartridge to ultimately move under the force of gravity into engagement with the cable to be slit so that the blade edge positioned adjacent the slot in the slitter cartridge engages and slits the periphery of the cable. After first forming a substantially annular slit the slitter cartridge continues to draw the cable more deeply into the slot until it reaches the base of the slot which is aligned diagonally relative to the longitudinal axis of the cable. Once the cable is caused to bear against the sloping face of the cable, the slitter cartridge is caused to be tilted diagonally relative to the cable longitudinal axis, which tilting is permitted due to the configuration of the guide grooves provided for the slitter cartridge. This operation causes the formation of a helical shaped slit extending from the annular shaped slit toward the adjacent end of the cable.

During this operation the cable is restrained from rotation by a releasable clamping means mounted for free slidable movement upon a support positioned adjacent the slitter cartridge. The discharge of the cable being stripped from the slitter cartridge moves the clamping means along the support until the cable is fully discharged from the slitter cartridge. The clamping means is provided with a pair of claws for piercing the outer layer of the cable at a predetermined instant of time. The claws, however, are restrained from engaging and piercing the cable outer covering until the cable is fully withdrawn from the clamping means, at which time the claws are caused by suitable biasing means to bite into the outer covering causing the slitted portion to be stripped from the cable as the cable is removed from the clamping assembly. The pulling force applied to withdraw the cable need only be very slight due to the novel slit formed in the cable outer covering.

It is therefore a primary object of the present invention to provide an appartus for substantially automatically stripping coaxial cables, conductors having outer insulating covers and the like, providing means for forming a helical slit in the portion of the outer covering to be stripped and providing clamping means for automatically removing the slitted portion as the cable is withdrawn from the stripping device.

Another object of the present invention is to provide clamping means for use in retaining cables and the like having an outer covering to be removed wherein the cable is restrained from rotation while a rotatable slitter means is employed to form first an annular shaped slit and then a helical shaped slit in a portion of the outer covering to be removed wherein the clamping means is provided with normally disengaged claws which are caused to pierce the outer covering near one end of the cable as it is withdrawn from the stripping device upon completion of the slitting operation.

These as well as other objects of the present invention will become apparent upon reading the accompanying description and drawings in which:

FIG. 1 is a simplified perspective view showing a conventional stripping mechanism.

FIG. 2 is a perspective view showing the physical structure of a conventional coaxial cable.

FIG. 3 is a side elevational view partially sectionalized to show the essential parts of a stripping device incorporating the principles of the present invention.

FIG. 4 is a side view of a covered cord showing the type of annular and helical slits formed in its outer covering by the stripping machine of FIG. 3.

FIG. 5 is an end elevational view of the portion of the device shown in FIG. 3 looking in the direction of arrows A—A.

FIG. 6 is a perspective view showing the cord guide and clamping means and its cooperating slide bed, the view of FIG. 6 being more detailed than that shown in FIG. 3.

FIGS. 7a through 7c are side elevational views, partially sectionalized, showing the various stages in the final stripping process in which the covered cord is stripped by means of the cord guide claw members shown in FIGS. 3 and 6.

FIG. 8 is a perspective view showing rotatable disc assembly portion of the embodiment of FIG. 3.

FIG. 9 is a perspective view showing the slitter cartridge which forms part of the assembly of FIG. 3.

FIGS. 10a and 10c are front views of the slitter cartridge and cable useful in explaining the stripping operation.

FIGS. 10b and 10d are end views of the slitter cartridge and cable shown in FIGS. 10a and 10c, respectively.

FIG. 1 shows in a very simplified manner the structure normally employed for stripping fine cables (i.e. cables of small diameter). Cable 1 shown therein is comprised of a central conductor 1a covered by an outer insulating sheath 1b. The cutting blades 2 and 3 are positioned a predetermined distance from the right-hand end of the cable in accordance with the length of the outer sheath to be stripped and are then moved in the direction shown by arrows 2a and 3a to form a desired cut or slit in the outer sheath. The notches 2b and 3b provided in the cutting edges conform to the inner diameter of the sheath 1b. After the blades 2 and 3 are driven into cutting engagement with cable 1 they are retained in this position while the cable is clamped by means not shown and pulled in the direction shown by arrow 1c so as to pull or remove the section of the sheath 1b extending from the blades 2 and 3 toward the right-hand end of the cable. As is well known this method is effective when used with conventional covered wires which have relatively small diameters. However, communication cables, coaxial cords and the like or cables having substantially large outer diameters cannot be stripped by such conventional devices due to the large pulling force required to form the slit in the cable sheath and to draw the portion to be cut away from the body of the cable. In addition thereto the conventional apparatus of FIG. 1 will also damage the underlying woven layer of the coaxial cable necessitating that the stripping operation be performed manually which is quite time consuming.

FIG. 2 shows a conventional coaxial cable which may be most advantageously stripped by the apparatus of the present invention, to be more fully described.

The coaxial cable of FIG. 2 is comprised of a central conductor 4 covered by an insulating layer or body 5. Surrounding layer 5 is a metallic woven fabric or soft copper wire shield braid 6 which is ultimately surrounded and enclosed within an outer insulating layer or sleeve 7. A primary object of the stripping operation is to bare or strip away a portion of the outer sleeve 7 to expose the shield braid 6 in the manner shown in FIG. 2 without causing any damage to braid 6.

FIG. 3 illustrates a coaxial cord stripping device which constitutes one preferred embodiment of the present invention and which is designed to strip coaxial cords such as shown in FIG. 2 in the manner previously described. The coaxial cord of FIG. 2 is comprised of a core conductor 4 which may be formed of copper or any other suitable highly conductive material, an insulating cover 5 which may be formed of a polyethylene, shield braid 6 which may be a fine soft copper wire braid and a sheath 7 which may be formed of polyvinyl chloride.

The stripping device shown in FIG. 3 is comprised of a motor 9 mounted upon a base 8. The motor 9 is provided with a shaft 9a having rigidly mounted thereto a sleeve 10 which serves to transmit rotation of the motor to a freewheeling roller 12 by way of a friction roller 11 in a manner to be more fully described. The free wheeling roller 12 is free to rotate relative to the main spindle 13 of the device. However, limited magnitude of turning torque is delivered from free wheeling roller 12 to the main spindle 13 through the employment of a helical shaped control spring 14 compressed between a pair of ring nuts 15a and 15b and the left face of free wheeling roller 12. The torque control spring 14 urges free wheeling roller 12 toward the right so that its right-hand face makes surface contact with the face 13b of collar portion 13a provided on main spindle 13. The predetermined pressure is controlled by the axial position of the two ring nuts 15a and 15b which are adjustably mounted upon the spindle 13, for example, by making threaded engagement therewith. Ring nut 15b may be positioned along the length of spindle 13 to obtain the desired pressure. Ring nut 15a is then turned and tightened into firm engagement with ring nut 15b to maintain the desired pressure. The above arrangement allows some slip to occur between the contacting surface (i.e. the right-hand surface) of roller 12 and the adjacent surface of 13b of collar portion 13a, when the main spindle 13 is overloaded for any reason during rotation of the free wheeling roller and thus is not only effective in preventing motor 9 from experiencing any extraordinary load but further serves as a safety feature.

Spindle 13 is journaled within a bushing 17 and is thereby rotatably supported therein. The bushing 17 is force fitted into a bearing bracket 16 so as to experience no rotation relative to bracket 16. The spindle 13 is further provided with a flange 18 connected to the extreme right-hand end of the spindle. The spindle 13 has a hollow interior 13c for receiving a covered cord or cable, for example, of the type shown in FIG. 2, in readiness for a stripping operation.

A scaled rod 19 is fitted into the spindle interior 13c for axial sliding movement and can be adjusted to any linear position and retained in this position by a set screw 20 provided near the left-hand end of spindle 13 so that the covered cord inserted into the spindle may be stripped over a preselected axial length from its inserted end which corresponds to the distance between the inner end of the scale rod 19 and the cutting member 25, as long as the cord end is in its fully inserted position abutting against the inner end of the scale rod 19. Although a more detailed description of the operation of the device will be given hereinafter, it is sufficient for the present purpose to understand that the cable to be stripped is inserted into the right-hand end of the spindle opening 13c so that its left-hand end is aligned with the left-hand end of scale rod 19. The scale rod 19 is provided with a knurled portion 19a at its left-hand end to facilitate axial movement of the scale rod within the spindle opening 13c. To facilitate adjustment of the scale rod, graduated markings or other suitable indicia 19b may be provided along the periphery of the scale rod so as to be lined up with the extreme left-hand end of spindle 13 in order to accurately and easily adjust the amount of the outer covering to be stripped. In operation the scaled rod is moved axially until the appropriate graduation or indicia is positioned in alignment with the extreme left-hand end of spindle 13. The set screw 20 is then tightened to retain the scale rod in this position and the cable is then inserted into the right-hand end of the spindle opening 13c. The cable is inserted until its extreme left-hand end is in alignment with the extreme left-hand end of the scale rod 19, thereby very accurately controlling the length of the outer covering to be stripped. The cable is maintained in this position and restrained against any rotational movement by the clamping means of FIG. 3, to be more fully described.

The drive system serving to transmit rotation of the shaft of motor 9 to main spindle 13 is, in the embodiment shown, of the frictional type, including a frictional roller 11 and free wheeling roller 12 but it should be understood that the power transfer means may be modified to include or employ a gear or belt type transmission system if desired.

FIG. 5 is an end elevational view of FIG. 3 looking in the directions of arrows A—A. The mechanism for transmitting rotation of motor sleeve 10 to main spindle 13 will be described with reference to this figure.

The friction roller 11 is rotatably mounted by a pin 11a to a roller lever 22 which may be freely rocked about the axis of a pivot shaft 21 secured to bracket 16. The roller may be brought into rolling contact with both free wheeling roller 12 and motor sleeve 10, as shown in the solid line position of roller 11 and roller lever 22. A lever spring 23 secured at its opposite ends between pin 11a and a stationary pin 23a is provided to bias the friction roller in the direction shown by arrow 23b as a result of the spring tension so that the normal position for roller 11 is to be maintained into firm rolling contact with free wheeling roller 12 and motor sleeve 10.

When motor sleeve 10 rotates in the counterclockwise direction, as shown by arrow 10a, torque is transmitted through friction roller 11 which rotates in the direction shown by arrow 11b, to free wheeling roller 12, which rotates in the direction shown by arrow 12a. The slippage coupling between free wheeling roller 12 and spindle 13 transmits a portion of the torque applied to free wheeling roller 12 to the spindle 13.

A handle gripping portion 22a which is integral with roller lever 22 is provided to interrupt transmission of the turning torque from motor sleeve 10 to free wheeling roller 12 whenever termination of torque application is desired. Thus, torque transmission for motor sleeve 10 to free wheeling roller 12 is interrupted by pulling the handle 22a from the solid line position to the dotted line position so as to displace friction roller 11 from solid line position B to the disengaged position C.

Pulling of the roller lever handle 22a in the manner described above allows the rotary disc assembly 24, shown best in FIG. 3, to assume its rest position at all times with the slitter block 25 caused to be moved to its lowermost position. Regardless of the location of the rotary disc assembly 24 at the time that the driving torque is removed the unbalanced weight condition causes the slitter block 25 to move to the bottom dead center position shown in FIG. 3 so that the bottom edge of the slitter cartridge 25 rests upon the top surface of the cover lid 107, to be more fully described.

In this position the device of FIG. 3 is now ready for insertion of a cord to be stripped. Summarizing, by operating the handle 22 of friction roller 11, main spindle 13 connected to the rotary disc assembly 24 is free to rotate since it is not impeded by any structure, thereby allowing the rotary disc assembly 24 to assume the bottom dead center position shown in FIG. 3.

The rotary disc assembly 102, shown best in FIGS. 8–10d is comprised of a pair of mutually parallel guide frames 104 and 105, each having a guide groove 104a and 105a likewise arranged in parallel fashion and being of a predetermined depth. A slitter cartridge 25, which is preferably a solid substantially rectangular-shaped block is slidably fitted in the guide grooves 104a and 105a so as to experience free sliding movement therein.

The grooves 104a and 105a extend to the very bottom of guide frames 104 and 105 to permit removal and replacement of the slitter cartridge 25. The slitter cartridge is retained within the guide frames by means of a pivotally mounted lid rotatable about the axis of a fulcrum screw 108 secured at one end thereof to guide frame 105 and lid 107. The opposite end of lid 107 is provided with a shoulder or notch 107a for cooperation with a lid holding lever 109 which is secured to guide frame 104 by means of a mounting bracket 132 which receives and retains the ends of a pin member 133 which passes through a suitable opening (not shown) in lid holder 109. The lower end 109b of lid holder 109 projects at right angles to the main body of the holder so as to overlie shoulder 107a in lid 107. The lid holder is normally biased in the clamping position by means of a biasing spring 134 secured at its opposite ends within suitable openings in frame 104 and the handle portion 109a of lid holder 109. The cartridge may be removed simply by depressing the handle portion 109a of lid holder, causing it to move toward the confronting surface of guide frame 104, thereby lifting its clamping portion 109b out of engagement with the shoulder 107a provided in lid holder 109. This allows the lid holder 109 to move from its solid line position to the dotted line position, enabling the slitter cartridge to be dropped out of frame 105 for replacement, adjustment, inspection, and the like.

The slitter cartridge 25 may be replaced and maintained in the position shown in FIG. 8 simply by lifting the lid 107 from the dotted line to the solid line position. The lid holder 109 should be held with its handle 109a in the depressed position to enable the holder 109 to clear the lower portion 109b thereof at which time the lid holder may then be released, causing the shoulder 107a to be clamped thereby.

Grooves 104a and 105a in guide frames 104 and 105, respectively, are further provided with enlarged portions 104b and 105b, respectively, to enable the slitter cartridge 25 to move to an inclined position in one stage of the cutting operation in a manner to be more fully described.

FIG. 9 shows a detailed perspective view of the slitter cartridge 25 which is provided with a lead groove or slot 117 having a width preferably slightly greater than the outer diameter of the insulating sheath to be stripped. A substantially U-shaped holder plate 114 is secured to one face of slitter cartridge 25, and is held in position by fastening members 116. The slot in holder plate 114 is preferably of the same dimension as the slot 117 in cartridge 25. A blade member 115 is positioned between the holder plate 114 and the confronting face of cartridge 25, and is provided with suitable openings 115a (only one of which is shown) for receiving a pair of fastening members 116. The blade is positioned so that its cutting edge 115b extends into the slot or groove 117 so that the distance between cutting edge 115b and the opposite surface of the slot 117 corresponds to the depth of the cut to be formed in the insulating sleeve provided on the cable.

The bottom or base of slot 117 is sloped or inclined, as indicated at 118 (note also FIGS. 10a, 10c and 10d), to facilitate the formation of the helical cut in a manner to be more fully described. The guide pins 119a–119b and 119c–119d are secured in suitable openings provided in the slitter cartridge block 25 and project outwardly by an amount sufficient to be received by the guide grooves 104b and 105b, respectively, in the manner best shown in FIG. 8. The guide pins are preferably of a length insufficient to make frictional engagement with the floors of guide grooves 104b and 105b so as to enable the slitter cartridge to be freely slidable within the grooves.

In the preferred embodiment of the present invention, the structure of the slitter cartridge may be modified in various ways (not shown) without impairing its successful operation. One example of such modification includes the provision of a lead slot 117 which is freely adjustable in width to accommodate covered cords of varying outer diameter. This may be brought about by providing a plurality of sections 136 secured to the main body of the guide block by fastening means 137. Removal of any one of these sections, or all of them, provides a slot 117 of increasing width. In a contrary fashion, insertion of one or more of the sections 136 provides a slot of diminishing width to accommodate cables of varying outer diameters.

As shown in FIG. 9, the openings 115a (only one of which is shown) for receiving a pair of fastening members 116 may be elongated slots for adjustably positioning the blade edge 115b at varying distances from the opposite edge of the slot 117. As another alternative, each blade may be provided with a pair of circular openings positioned at differing distances from the blade edge. Each time a cable of a differing diameter is to be stripped, the slitter cartridge may be removed from the assembly shown in FIG. 8 and the appropriate blade may be mounted thereto.

The blade 115 may take many different forms other than the razor-like form shown in FIG. 9. For example, the blade may be provided with a sawtooth or serrated cutting edge for the purpose of increasing the intensity of the biting engagement between the blade and the insulating sheath. Such a serrated cutting edge has been found quite advantageous for use with coverings having a large radial thickness and for cables having large outer diameters. Obviously, any other cutting edge configuration may be employed commensurate with the particular material which is employed in the cable covering.

Reference will now be made to FIGS. 8 and 10a–10d for the purpose of describing the operation and most important functions of the present invention, including the cable cover slitting action of the slitter cartridge and the function of discharging the covered cord from the slitter cartridge while forming a helical slit in the cable insulating sleeve.

The coaxial cable or other type cable or wire having an insulating sheath is inserted through the right-hand end of guide aperture 29 and spindle bore 13c until its left-hand end extends a predetermined distance to the left-hand edge of scale rod 19, with the distance between blade 115 and the left-hand end of scale rod 19 being determinative of the amount of the insulating sleeve to be stripped from the cable. Actually, preparatory to the insertion of the cable the rotary disc 102 should be positioned so that the slitter cartridge occupies the position shown in FIG. 8 wherein the open end of the slot in cartridge 25 is positioned beneath the cable 103. As a further preparatory measure, the appropriate guide aperture 29 is moved and duly locked into position by detent pin 31a so as to confront axial cavity 13c with an opening which is preferably just slightly greater in diameter than the outer diameter of the cable. The cable 103 with the insulating sleeve is held against rotation by holding member 32.

As shown in FIG. 10a the slitter cartridge is initially in the solid line location C before rotation of the spindle 13 and disc 102 is initiated. Rotation in the clockwise direction relative to FIG. 10a and 10c is imparted to spindle 13 and hence to disc 102 causing the guide frames 104 and 105 and hence the slitter cartridge 25 to move to the phantom line position D. As soon as the position D is reached the slitter cartridge 25 is caused to slide by gravity along the guide grooves 104a and 105a in a direction so as to cause the open end of the slot 117 to approach the sheathed cable 103 until the cartridge 25 assumes the position D at which time the cutting edge of blade 115 comes into contact with the periphery of the cord or cable 103.

As rotation is continued in the clockwise direction (relative to FIGS. 8, 10a and 10c) the cutting edge of blade 115 begins to cut into the insulating sleeve covering the cable and forms a slit therein in a progressive fashion as the cartridge slides radially inward relative to the rotatable disc 102, such as, for example, the position E where it can be seen that the cartridge 25 has experienced both rotational movement from the orientation of position D, as well as linear movement wherein it moves inwardly along a radial line of disc 102, in effect causing the cable 103 to move deeper and deeper into slot 117. This slitting operation will be referred to hereinafter simply by "slitting."

The principle of the slitting operation is as follows:

As the slitter cartridge 25 rtoates in unison with rotatable disc 102 about the longitudinal axis of covered cords or cable 103 while the cord or cable is restrained from rotation, the surface of the cable now positioned within the slot 117 comes into surface contact with the side wall opposite the blade cutting edge, as well as the blade cutting edge itself. In this position, the cable cover is subjected to a frictional drag imposed upon it by the side wall of the slot 117 opposite the blade cutting edge and at the same time is subjected to the resistance of the blade edge as it is forced to cut into the cord covering. Under these conditions the frictional drag of the side wall of the slot opposite the blade cutting edge is smaller than the resistance of blade 115 and the cable 103 is thus subjected to an unbalanced resultant resistance which causes the cable to slip over the one side wall of the lead groove 117 while the blade edge cuts into the periphery of the cable. As a result the cable, which conversely can be considered as rotating in the counterclockwise direction relative to cartridge 25, is caused to move deeper and deeper into the slot until it reaches the face or floor 118 of the slot, rolling on the blade cutting edge and thereby forming an annular slit 101, as shown best in FIG. 4.

By the time the cable 103 reaches the bottom of slot 117 it is completely slitted about its periphery. At this time the slitter cartridge 25 reaches the solid line position F, shown in FIG. 10c. As rotation continues in the clockwise direction, as shown by arrow K in FIG. 10a and 10c, the cutting edge of the blade 115 tends to continue its slitting action and thereby causes the slitter cartridge 25, which has previously been slitting the covered cable 103 at right angles to its longitudinal axis, is caused to move to an inclined position as shown by the dotted line position G of FIG. 10d, as a result of the force imparted upon slitter cartridge 25 by the cable surface as the cable tends to urge itself against the sloping surface 118 provided at the base of the cartridge slot 117. At this time the guide pins 119a and 119c are permitted to enter into the widened portions 104b and 105b of the guide grooves 104a and 105a, respectively, enabling the slitter cartridge 25 to readily and easily move to the inclined position relative to the cable 103 as is indicated by the dotted line position G shown in FIG. 10d. This motion will hereinafter be referred to as "sloping."

The slitter cartridge 25, in its inclined position G, continues rotation causing the cutting edge of the blade 115 to cut into the insulating sleeve of cable 103 in a manner such as to automatically discharge the cable (i.e. move it toward the right relative to FIG. 2) from slitter cartridge 25 while simultaneously forming a helical slit or cut in the cord covering. This operation will hereinafter be referred to as "helical slitting." The movement of the cable 103 toward the right continues until the helical slitting is completed and the cable is completely delivered or ejected from slitter cartridge 25. Once the annular cut 101 and the helical cut 106 have been formed in the periphery of cable 100 (see FIG. 4) the stripping operation can be easily and quickly completed by removing the helically cut portion through an "unwinding" operation in which the cutaway portion is unpeeled by the assembly to be more fully described.

The rotary disc assembly 102 is firmly secured to flange 18 and is thus arranged to rotate together with main spindle 13. Rotary disc assembly 102 has a slitter block 25 incorporated therein, so that the latter can rotate together with the rotary disc about the longitudinal axis of the covered cord while forming a slit in its covering in the manner previously described. With the rotary disc assembly 102 in the rest (bottom dead center) position, the slitter block 25 is maintained in the position shown in FIG. 3 under the effect of the eccentric weight of disc 102 and under the above described action in which the friction roller 11 is disengaged from motor sleeve 10 and free wheel 12.

The cable, as was previously described, is loaded into the right-hand end of spindle opening 13c and is inserted preferably so that its left-hand end is aligned with the left-hand end of scaled rod 19 to very accurately control the length of outer covering to be stripped. Once this operation is completed and once the cable has been appropriately clamped (in a manner to be more fully described) the lever handle 22a may be released, allowing the rotary disc assembly to initiate rotation. The slitter unit is thus operated to make first an annular-shaped slit, followed by a helical-shaped slit in the outer covering of the covered cord. As rotation continues, the covered cord is acted upon by the slitter assembly in a manner previously described, so as to be delivered out of the rotary assembly 102 which causes the cable to move toward the right as shown by arrow 103d until the covered cord is completely released from the slitter cartridge. Linear movement of the covered cord occurs during the helical slitting operation at which time a slit of helical configuration is formed in the outer covering to a predetermined depth.

The slitter blade construction is not subject to any particular limitations but may be made in any desired fashion as long as it functions first to form initially an annular slit in the outer covering of the covered cord and subsequently to deliver the covered cord out of the slitter cartridge and toward the right simultaneously with the formation of a spiral slit in the cord outer covering, which slit extends from the annular shaped slit to the extreme left-hand end of the cable.

The functions of clamping the cable against rotation while enabling the cable to experience linear movement during the slitting operation and ultimately for "peeling off" the slitted portion is performed by the clamping mechanism located to the right of the rotary disc assembly 24. As shown therein, this assembly is comprised of a slide bed 27 (note also FIG. 6) which is positioned for sliding movement within a channel 36a provided in a guide frame 36 positioned upon base 8. The slide bed 27 is free to move in the axial direction of main spindle 13 and is retained within the channel 36a by means of the flared lower edges 27a provided near the bottom sides of the slide bed which cooperate with double undercut grooves in the channel.

Secured to slide bed 27 is a cord guide assembly 29 which is linearly moveable in a direction transverse to the direction of movement of slide bed 27 and which is provided with a plurality of guide apertures 29a of graduated diameters to receive covered cords of graduated external diameter. Lock holes 29b are provided in the bottom surface of cord guide 29 (only one of which is shown in FIGS. 3, 6 and 7) for the purpose of aligning one of the guide holes 29a with the axial bore 13c of spindle 13. Alignment is maintained by means of a leaf spring 31 secured to the slide bed 27 by a stopper pin 30 provided at one end of the leaf spring and carrying a lock pin 31a at the other end of the leaf spring. The stopper pin 30 is fixed to the slide bed 27 while the lock pin 31a is positioned in one of the lock holes 29b dependent upon the particular guide hole to be coaxially aligned with the axial bore 13c of spindle 13.

A cord holder 32 is mounted upon the rear portion of slide bed 27 and is secured to a rotatable pin 33 having a pair of knobs 34 (only one of which is shown in FIG. 6 for purposes of simplicity) which knobs are affixed to the opposite ends of pin 33. The cord holder 32 can be rotated from the solid line position D of FIG. 3 to the dotted line position E by manipulation of either one or both of the knobs 34. The function of the cord holder is to prevent rotation of the covered cord inserted through one of the guide holes 29a in cord guide 29. The insertion operation is performed in the following manner:

With the cord holder 32 in the solid line position D, the covered cable is inserted through an appropriate guide hole 29a and through the axial bore 13c until its left-hand end is in alignment with the left-hand end of scale rod 19. Upon completion of this operation, the knobs 34 are manipulated to move the cord holder 32 to the dotted line position E. This bends the cable upwardly, causing frictional engagement between the outer surface of the cable and the internal surface of the associated guide hole 29a thereby preventing the cord from experiencing any rotation about its longitudinal axis during the performance of the diagonal slitting operation in the formation of the helical slit.

A leaf spring switch 35 is secured to the bottom surface of the slide bed 27 and is provided with a pair of connecting terminals 35a for series connection between a power source (not shown) and the power leads (not shown) of motor 9. The contacting terminals 35b of leaf spring switch 35 are normally biased toward the disengaged position, as shown in FIG. 3, so as to prevent the power source from being coupled to motor 9. A switch pin 32a which forms an integral part of the cord holder 32 normally occupies the position shown in FIG. 3. However, when the cord holder 32 is rotated to the dotted line position E, switch pin 32a bears against the upper contact member of contact pair 35b so as to close the contacts and couple power to motor 9. This switch and switch pin assembly thereby prevents operation of the slitting device until the covered cord to be stripped is appropriately loaded and restrained against axial rotation by movement of the cord holder to the dotted line position E.

Channel member 36 is provided with an elongated slot 36b to provide an unimpeded path along which the leaf spring 35 may move together with stopper pin 30 when the slide bed is moved along the cooperating channel member 36.

Once the cord to be stripped has been properly loaded and restrained against rotation by movement of the cord holder 32 to the dotted line position E so as to bend the cable, the rotary disc assembly 24 carrying slitter blocks 25 operates in the manner previously described to first form the annular shaped slit and then to form the helical shaped slit in the cord outer cover while at the same time causing the cable 103 and the slide bed 27 to move from the position shown in FIG. 3 toward the right along channel member 36, as indicated by the arrow 1d. The cord outer covering is thus slit first in an annular fashion and then in a spiral or helical fashion in readiness to ultimately be stripped of its sheathed slitted portion. This function is performed by claw members 37 and 38 which are pivotally mounted in pairs along the cord holder and guide 29. Each pair is comprised of a claw member 37 positioned above its corresponding guide aperture, as can best be seen in FIG. 6. The other claw member is pivotally mounted to lie below its associated cord guide opening.

A pair of elongated rods 39 and 40 are rotatably mounted within suitable support brackets 39a and 40a. Rods 39 further thread through suitable openings in claw members 37a–37f while rod 40 is threaded through suitable openings provided in claw members 38a through 38f, respectively. Each of the claw members is fixedly secured to its associated rod by fastening means 39b, for example, wherein any rotation imparted to the rod 39, for example, will be directly transmitted to all of the claw members 37a–37f respectively. The lower rod 40 and its associated claw members 38a–38f operate in a similar manner.

The right-hand end of each of the rods 39 and 40 have rigidly secured thereto by suitable fastening means 41a and 42a the levers 41 and 42, respectively, which are normally biased in the counterclockwise and clockwise directions, respectively, by means of biasing springs 43 and 44, respectively, whose first ends are coupled to a pin 60 and whose opposite ends are coupled to pins 41b and 42b, respectively, rigidly secured to the free ends of the levers 41 and 42.

The cover stripping process which occurs immediately after the slitting operation will now be described with reference to FIGS. 7a–7c:

The annular and helical slitting operation causes the slide bed 27 and the cord 103 to be driven from the solid line position shown in FIG. 3 toward the right, as indicated by arrow 103d. Ultimately, the slitter cartridge assembly completely discharges the cord being stripped so that its extreme left-hand end is fully disengaged from the slitter cartridge. The covered cord is now free to be removed from the stripping mechanism of FIG. 3. This operation may be performed by turning one or both of the knobs 34 so as to move the cord holder 32 to the solid line position D. The cord may now be withdrawn from the mechanism by moving the cord linearly toward the right as shown by arrow 103d.

During the time in which the slitting operation is being performed and in addition thereto, during the time in which the cord is being moved toward the right as shown by arrow 1d (see also FIGS. 7a–7c) the biting claw portions 48 and 49 provided on each claw member 37 and 38 are displaced away from the outer diameter of the cord 103, as shown in FIG. 7a. This is as a result of the projection portions 46 and 47 of each claw member which make sliding engagement with the cord outer periphery to maintain the biting claw portions in the displaced position.

The withdrawal of the covered cord 45 is continued in the manner described hereinabove until the covered cord reaches the position shown in FIG. 7b. At this time the rounded projections 46 and 47 "snap off" the periphery of the cable and move toward one another until they reach the final position shown in FIG. 7c. The snapping of the claw members toward the position shown in FIG. 7c is due to the spring tension applied to the claw members by spring biasing the spring tension of springs 43 and 44. The abrupt snapping action drives the biting claws 48 and 49 into biting engagement with the slitted portion of the cord outer covering. As the covered cord is withdrawn from the guide assembly 29, the helically slitted cover portion is first expanded in the manner shown in FIG. 7c and ultimately is stripped away from the main body of the covered cord due to the holding or clamping force applied to the extreme left-hand end of the slitted portion as the cord is being withdrawn. Light hand-pressure is quite sufficient for the withdrawal operation to assure that the slitted cord outer cover will be stripped and completely removed from the main body of the covered cord.

From the above description setting forth the construction and operation of the present invention, the advantageous features and effects of the invention can be summarized as follows:

Since a spiral or helical-shaped slit is formed about the periphery of the cord outer cover, which helical slit is a continuation of an initially formed annular slit, the slitted cover portion may be quickly and easily stripped off in an "unwinding" fashion and no large external force need be exerted upon the covered cord being stripped, light-hand-pressure being more than satisfactory to complete the stripping operation. Due to the novel slitting operation the braided sheath 6 is not damaged in any way. This feature is extremely important in cases where large diameter covered cords are to be stripped since conventional methods for stripping such large diameter cords have been proven to be unsuccessful.

Moreover, owing to the helical stripping feature of the present invention, covered cords can be easily stripped even if the slit formed in the cord covering is not of a depth so as to cut through the entire thickness of the outer covering. Thus, in accordance with the technique of the present invention, cord coverings can be stripped while keeping the portion underlying the outer covering completely out of contact with the slitter blade. By controlling the depth of the cut or slit formed in the cable, the slitted portion may thus be removed from the main body of the cable without causing any damage to the underlying sheath.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A stripping machine for stripping an end portion of a covered cord outer insulating cover comprising:
    rotary drive means;
    a free-wheeling rotary disc assembly;
    releasable means for selectively driving said rotary disc assembly by said rotary drive means;
    said rotary disc assembly including a cutting assembly adapted to rotate upon said rotary disc assembly about a cord inserted into the machine and being comprised of an outer cord section a portion of which is to be stripped off and an inner cord section in contact with said outer cord section;
    said cutting assembly initially forming an annular slit along the outer periphery of said outer cord section and subsequently forming a helical slit extending lengthwise of the cord from the annular slit toward the adjacent end of the cord;
    the weight of said rotary disc assembly being eccentrically disposed with regard to its axis of rotation so as to move said cutting assembly to a bottom dead center position when said disc assembly is released from said drive means by said releasable means.

2. The device of claim 1 wherein said releasable means includes clutch means for transmitting the turning torque of said rotary drive means to said rotary disc assembly when said releasable means couples said drive means to said rotary disc assembly.

3. The device as set forth in claim 1 in which said rotary disc assembly further includes a central opening adapted to receive that portion of said covered cord extending adjacent to said end and which further comprises a measurement facilitating member aligned with said central opening and being adjustably arranged to slidably receive said covered cord end therein when the latter is extended through said central opening so that said cord end is inserted into said facilitating member prior to the formation of the annular slit to form an annular slit at any desired longitudinal distance from the end of said covered cord.

4. The device of claim 1 further comprising:
a cord holder movable between first and second positions;
said first position facilitating insertion of said cord into the rotary disc assembly to enable the formation of the annular slit in said cord;
said second portion being adapted to restrain the covered cord placed in said rotary disc assembly against axial rotation;
said cord holder being linearly movable relative to said rotary disc assembly and lengthwise of said cord as said rotary disc assembly forms a helical spiral slit in the periphery of said cord.

5. The device of claim 4 in which:
when said cord holder is in its first position, said releasable means is adapted to interrupt the torque transmission from said drive means to said rotary disc assembly enabling the free-wheeling rotary disc assembly and, when said cord holder is in said sec-said cutting assembly enables the insertion of said cord in the operative position in said rotary disc assembly and, when said cord holder is in said second position, torque transmission is effected from said drive means to said rotary disc assembly.

6. The device as set forth in claim 1 further comprising an outer cord section stripping device being operable, when said cord is moved in the direction away from said rotary disc assembly after said annular slit has been completely formed in said cord by said rotary disc assembly, to strip off that portion of the outer cord section which extends between said annular slit and said end of the cord, said outer cord section stripping device comprising:
guide members making sliding engagement along the periphery of said cord at the initial state of movement of said cord in the direction away from said rotary disc assembly;
claw means movable with said guide members along said cord and being displaced from said cord periphery until said cord is withdrawn to such as extent as to release said guide members;
bias means urging said guide members toward one another to urge said claw means to bite into said outer cord section and subsequently to remain in the biting state when said cord periphery has passed beyond said guide members.

7. A device for automatically stripping coaxial cables and the like having an outer sheath surrounding and adjacent to a sub-layer, said device comprising:
a cutting assembly having an opening for receiving a coaxial cable;
a free-wheeling rotatable assembly; drive means for rotating said free-wheeling assembly;
means for slidably mounting said cutting assembly upon said free-wheeling assembly to enable said cutting assembly to selectively experience rotational and translation movement to form a slit in said outer sheath;
guide means axially spaced from the axially aligned with said rotatable assembly for guiding said cable during the slitting operation;
means for releasably coupling said drive means to said free-wheeling assembly.

8. The device of claim 7 wherein said cable guide means is comprised of a plurality of guide apertures arranged in side-by-side fashion along an imaginary line transverse to the axial direction of said free-wheeling assembly;
means for selectively positioning one of said guide apertures in coaxial alignment with said cutting assembly opening;
rotatable holding means movable to deform a portion of a cable threaded through the guide aperture in the operative position for restraining said cable from experiencing rotational movement.

9. The device of claim 8 further comprising channel means having a guide channel aligned in said axial direction;
a supporting base resting upon and being guided by said guide channel for supporting said cable guide means.

10. The device of claim 9 further comprising normally open switch means mounted upon said supporting base coupling said drive means to a source of power;
said holding means including a switch activating arm for closing said switch means when said holding means is moved to the cable deforming position.

11. The device of claim 8 further comprising plural claw means each positioned adjacent an associated guide aperture for embracing a cable threaded therethrough;
each of said claw means comprising a pair of levers each having a first arm pivotally mounted at a first end thereof;
first and second spaced projections extending transversely from each arm at its opposite end to form an F-shaped profile;
the first projection closest to said opposite end having a smooth edge at its extremity; said second projection being shorter than said first projection and being tapered to form a sharp point at its extremity;
means biasing said pair of arms toward said cable periphery;
said first projection being normally adapted to make sliding engagement with said cable periphery to displace said second projections from said cable periphery;
said bias means urging said second projections into biting engagement with said cable periphery as said first projection is slid off said cable periphery in the act of removing the slitted cable for stripping said slitted portion from main body of the cable.

12. The device of claim 8 wherein said cutting assembly is mounted upon said rotatable assembly in an offset manner relative to the assembly axis of rotation to provide an eccentric weight distribution, causing said free-wheeling assembly to rotate said cutting assembly to the bottom dead center position when said drive means is disconnected from said free-wheeling assembly.

13. The device of claim 8 further comprising slip clutch means coupled between said drive means and said free-wheeling assembly for preventing said drive means from being overloaded.

14. The device of claim 13 further comprising releasable power coupling means for selectively connecting said drive means to said free-wheeling assembly through said slip clutch means.

References Cited
UNITED STATES PATENTS

| | | | |
|---|---|---|---|
| 2,915,928 | 12/1959 | Felts et al. | 81—9.51 |
| 3,082,523 | 3/1963 | Modes et al. | |
| 3,153,958 | 10/1964 | Keys | 81—9.51 |

FOREIGN PATENTS 602,418   5/1948   Great Britain.

ROBERT C. RIORDON, Primary Examiner

R. V. PARKER, JR., Assistant Examiner